P. G. SEWARD.
TIRE.
APPLICATION FILED FEB. 13, 1912.
1,049,157.
Patented Dec. 31, 1912.
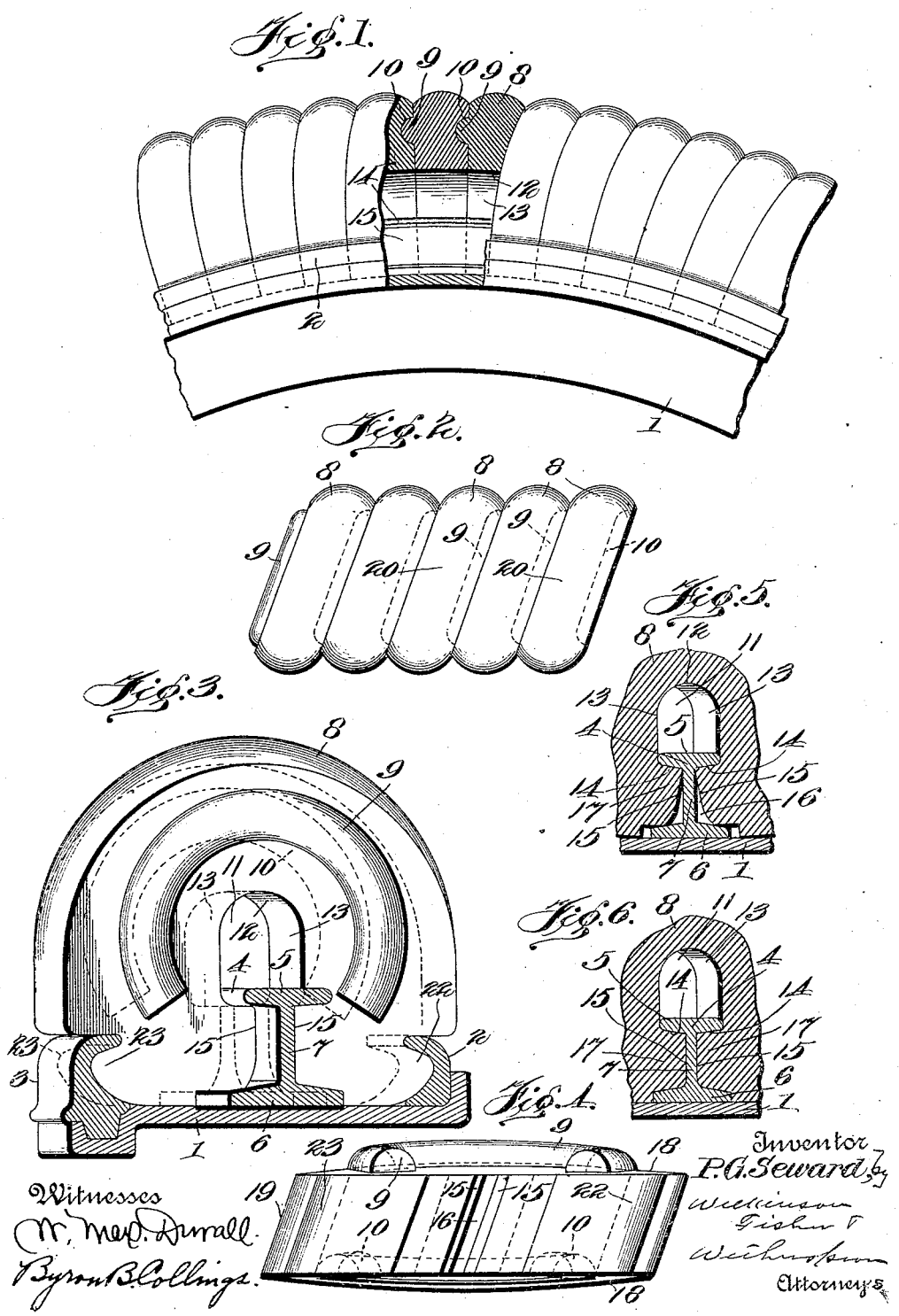

UNITED STATES PATENT OFFICE.

PERCY G. SEWARD, OF PETERSBURG, VIRGINIA.

TIRE.

1,049,157. Specification of Letters Patent. Patented Dec. 31, 1912.

Application filed February 13, 1912. Serial No. 677,325.

*To all whom it may concern:*

Be it known that I, PERCY G. SEWARD, a citizen of the United States, residing at Petersburg, in the county of Dinwiddie and State of Virginia, have invented certain new and useful Improvements in Tires; and I do hereby declare the following to be a full, clear, and exact description of the invention, such as will enable others skilled in the art to which it appertains to make and use the same.

This invention relates to cushion tires adapted for general use on vehicles, and has for its object to produce a tire of this character which will be simple in construction, efficient in action, and comparatively inexpensive to manufacture.

To these ends the invention consists in the novel details of construction and combinations of parts more fully hereinafter disclosed and particularly pointed out in the claim.

Referring to the accompanying drawings forming a part of this specification in which like numerals designate like parts in all the views:—Figure 1 is an elevational view partly in section of a portion of a tire made in accordance with my invention; Fig. 2 is a plan view of a plurality of the individual sections of which my tire is composed; Fig. 3 is an end elevational view of a section of the wheel rim, and of a tire made in accordance with my invention; Fig. 4 is a bottom plan view of an individual unit of which my tire is composed; Fig. 5 is a detail sectional view illustrating the shape of the opening of one of my resilient units before it is compressed in place; and, Fig. 6 is a view similar to Fig. 5 illustrating the fitting of the parts when the unit is compressed into the position shown in Fig. 3.

1 indicates a wheel rim provided with the usual detachable members 2 and 3, and 4 indicates a grooved ring member surrounding the rim 1 and capable of being readily slipped on and off the same, as will be more fully hereinafter disclosed.

The ring member 4 is provided with the top flange 5 and the bottom flange 6 preferably slightly longer than the top flange, the two flanges 5 and 6 being connected by the web 7, and thereby providing the groove like spaces shown on each side of said web 7.

The tire is made up of a plurality of individual resilient units 8, each provided on one side with a tongue like circular projection 9, and on its opposite side with a correspondingly shaped circular groove 10 into which a projection 9 of succeeding section fits, as will be clear from Fig. 1 of the drawings. The individual sections 8 are further provided with an opening 11 having a curved top 12 and straight parallel sides 13, as shown. The parallel sides 13 of said opening 11 join inwardly extending surfaces 14 connected to the outwardly inclined surfaces 15 on each side of the tapering slot 16, as best illustrated in Fig. 5.

The surfaces 14 and 15 bound resilient lugs 17 adapted to fit the grooves on each side of the web 7 of the ring like member. That is to say, when the resilient units 8 are in their normal uncompressed condition, the lugs 17 fit grooves on each side of the web 7, as illustrated in Fig. 5, but when the said resilient members 8 are under compression in the tire, the said lugs 17 are forced tightly up against the web 7 to form the joint illustrated in Fig. 6. The resilient units 8 are further of the shape illustrated in the various views. That is to say, their flat face surfaces 18 make an angle with their side surfaces 19 different from 90° so that the said units lie diagonally across the plane of the wheel, and therefore, the whole tread surface 20 of a given unit does not receive the same pressure at the same time, but the forwardly inclined portion of said tread surfaces first receives the pressure, and then successively other rearwardly located portions of said surfaces 20 receive said pressure. By this means, the wear and tear on the units is more equally distributed than would be the case if the said units 8 with their tread surfaces 20 were placed at right angles to the plane of the wheel. The said units 8 are further provided with outwardly extending lugs 22 adapted to be jammed into a correspondingly shaped groove with which the detachable member 2 is provided. The said sections 8 are also provided with oppositely disposed outwardly extending similar shaped lugs 23 adapted to fit into a similar shaped groove carried by the detachable member 3, as will be clear from Fig. 3 of the drawings.

In operation, the individual resilient members 8 are assembled on the ring like member 4 with the lugs 17 fitting the grooves on each side of the web 7, and between the flanges 5 and 6 of said ring like member, as shown in Fig. 5. When the parts are in this position, the tire by the aid of the ring like member 4, can be readily slipped on and off the wheel rim 1 as a unit. When it is slipped on the wheel rim 1, the lugs 22 of the different units 8 are jammed against the detachable member 2 of the wheel rim, and the detachable member 3 of said rim is next jammed against the lugs 23 of said units 8, whereupon the lugs 17 are forced tightly against the web 7 of the ring like member 4, and the joint illustrated in Fig. 6 is had.

I find that by making the surfaces 13 of the opening 11 straight, as shown, that more material is had in the individual units at or near the points where great strains are to be resisted, and that therefore, the said units stand up better or stand the wear and tear better than would be the case if the said surfaces 13 were curved. On the other hand, by making the top surface 12 of the opening 11 curved, as shown, the full resiliency of the members 8 is attained. The tongue and groove connections 9 and 10 aid in preventing dust entering the tire, and they further serve to hold the units 8 together, while allowing their full resiliency to come into play. Further, by providing the tapering slot or opening 16, illustrated in Fig. 5, I am enabled to put the individual sections 8 under strain when securing the same to the tire, and therefore, cause the said sections to be held more firmly between the members 1, 2 and 3 of the wheel than would otherwise be the case.

It will thus be seen that I have provided a demountable cushion tire made up of individual resilient sections 8 having tongue and groove connections therebetween, having an opening provided with substantially parallel straight side walls, a curved top, and a tapering slot entering said opening. It will also be further observed that my tire comprises a double flanged ring like member having grooves into which lugs on the individual units 8 may be forced and the said individual members thus put under strain when securing the said members to the wheel rim. By this particular construction, I am enabled to more firmly secure the individual members 8 to the wheel rim than would otherwise be the case, and therefore, I am enabled to better provide against the accidents due to skidding.

What I claim is:—

In a vehicle tire, the combination of a wheel rim; detachable members associated with said rim; a readily detachable ring like member having double flanges separated by a web to form oppositely disposed grooves fitting said rim; a plurality of resilient sections disposed at an inclination to the plane of the wheel each having outwardly disposed lugs fitting said detachable members, inwardly disposed lugs fitting said grooves, and an opening provided with a curved top surface and flat side surfaces, and said inwardly disposed lugs being separated by a normally tapering slot entering said opening; and a tongue and groove connection between adjacent resilient sections, substantially as described.

In testimony whereof, I affix my signature, in presence of two witnesses.

PERCY G. SEWARD.

Witnesses:
  WILSON B. PUGH,
  A. W. TOWNES.

---

Copies of this patent may be obtained for five cents each, by addressing the "Commissioner of Patents, Washington, D. C."